United States Patent [19]
Loveall, Jr. et al.

[11] 3,762,525
[45] Oct. 2, 1973

[54] DISTRIBUTOR DRIVE MECHANISM

[76] Inventors: George A. Loveall, Jr., 155 Martin Rd., Waterloo; Bernhard E. Jacobson, 158 Summit Dr., Cedar Falls, both of Iowa

[22] Filed: July 2, 1971

[21] Appl. No.: 159,114

[52] U.S. Cl. .................................. 193/23, 318/602
[51] Int. Cl. ............................................. B65g 11/20
[58] Field of Search ...................... 193/23; 318/162, 318/602, 695

[56] References Cited
UNITED STATES PATENTS

| | | | |
|---|---|---|---|
| 3,174,607 | 3/1965 | Cooper | 193/23 |
| 3,255,857 | 6/1966 | Armstrong | 193/23 |
| 3,322,273 | 5/1967 | Bailey | 193/23 X |
| 3,493,830 | 2/1970 | Sebastian | 318/602 |
| 2,476,673 | 7/1949 | May et al. | 318/602 |
| 1,192,685 | 7/1916 | Rickets | 318/695 X |

*Primary Examiner*—Evon C. Blunk
*Assistant Examiner*—W. Scott Carson
*Attorney*—Zarley, McKee & Thomte

[57] ABSTRACT

A drive mechanism for a material distributing system is disclosed herein. The distributing system comprises a plurality of downspouts and a movable distributor means which is in communication with a source of material. The distributor means is movable with respect to the downspouts to supply material to various of the downspouts. The drive mechanism is connected to the distributor shaft of the distributing system for rotating the shaft and the distributor means so that the distributor means communicates with a predetermined downspout. A control panel is located remotely of the distributor means and has a thumbwheel switch provided thereon which permits the operator to select the desired position for the distributor means. A control means is provided for selectively controlling the operation of the distributor means and includes a binary sensing means for sensing the position of the distributor means and the operation thereof. Energization of the system causes the distributor means to be rotated to the proper position with the control means sensing the rotation and deactivating the drive mechanism when the distributor means is in its proper position.

5 Claims, 6 Drawing Figures

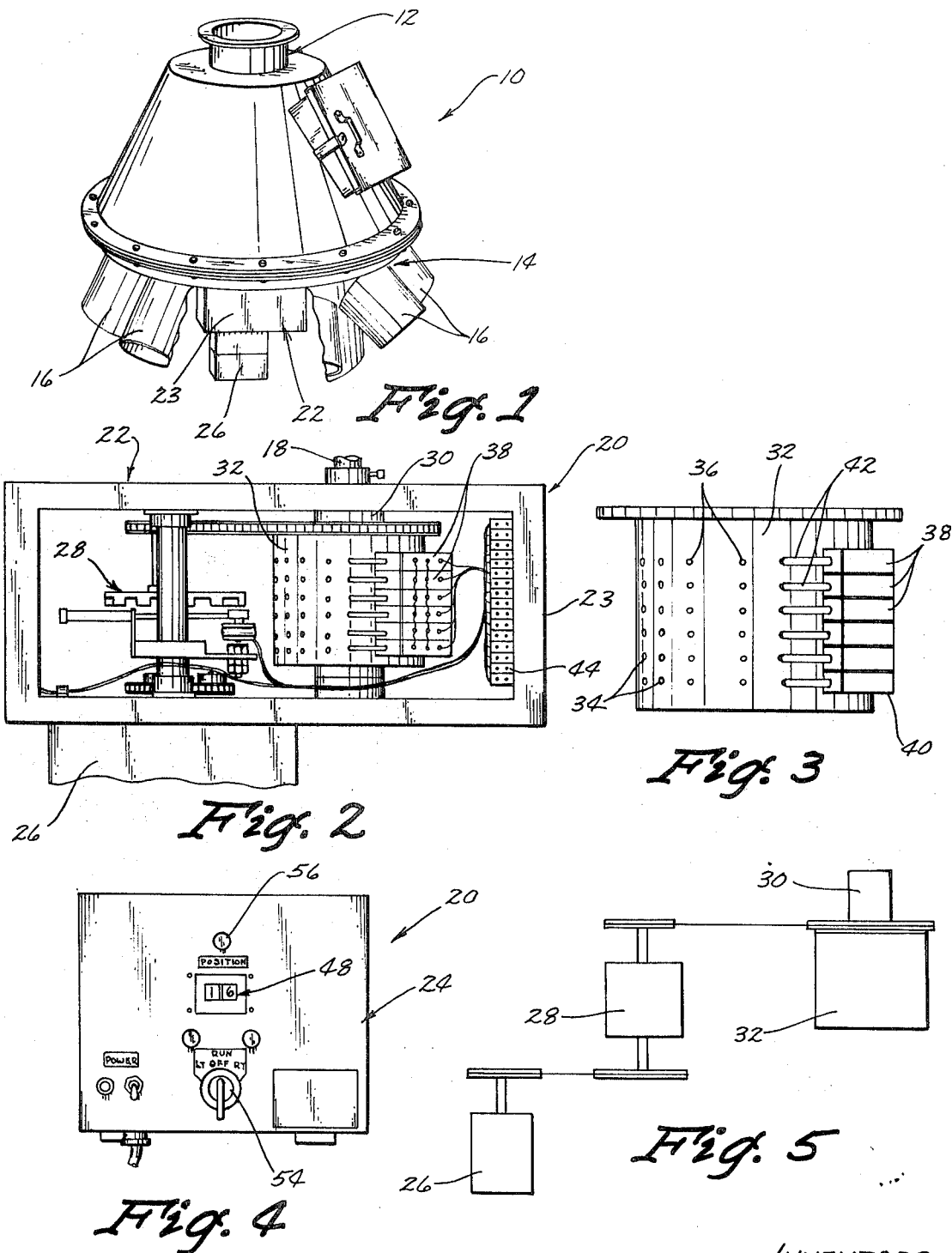

DISTRIBUTOR DRIVE MECHANISM

Material distributing systems for the distribution of grain, feed or other materials generally comprise a consignor or distributor chute which is in communication with the source of material and which is adapted to supply the material to a group of downspouts generally arranged in a 360° pattern. The individual downspouts are connected to storage bins or loading areas. In operation, the distributor chute must be placed in communication with the proper downspout so that the material will be directed to the proper bin or loading area. Needless to say, it is vitally important that the distributor chute be properly positioned to prevent the mingling of different materials and to insure that the proper material will be delivered to the proper area.

Some attempts have been made to electrically control the operation of the distributor chute but the control mechanisms are subject to malfunctions which are extremely troublesome. Additionally, those systems employing a large number of downspouts require a tremendous amount of electrical wiring to permit the sensing of the relative position of the distributor chute and to control the operation thereof. The aforementioned systems are not only very expensive to install but are difficult to maintain and repair.

Therefore, it is a principal object of this invention to provide a distributor drive mechanism.

A further object of this invention is to provide a distributor drive mechanism and control means therefor which positively properly position the distributor chute in its proper position.

A further object of this invention is to provide a distributor drive mechanism having simplified electrical circuitry.

A further object of this invention is to provide a distributor drive mechanism which is adapted for use with a large number of downspouts.

A further object of this invention is to provide a distributor drive mechanism having a binary control system.

A further object of this invention is to provide a distributor drive mechanism which may be mounted on the distributor shafts of a wide variety of distributors.

A further object of this invention is to provide a distributor drive mechanism comprising a shaft mounted gear reducer.

A further object of this invention is to provide a distributor drive mechanism having a digital thumbwheel switch to provide direct reading position indication.

A further object of this invention is to provide a distributor drive mechanism and control means therefor utilizing binary coding.

A further object of this invention is to provide a distributor drive mechanism and control means therefor which is adapted for use in a wide variety of environments.

A further object of this invention is to provide a distributor drive mechanism which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a top perspective view of the mechanism of this invention connected to a material distributing system:

FIG. 2 is a side view of the drive unit with the cover thereof removed:

FIG. 3 is a side view of the encoding drum and switches:

FIG. 4 is a front view of the control panel:

FIG. 5 is a block diagram of the power train; and

Figure 6:
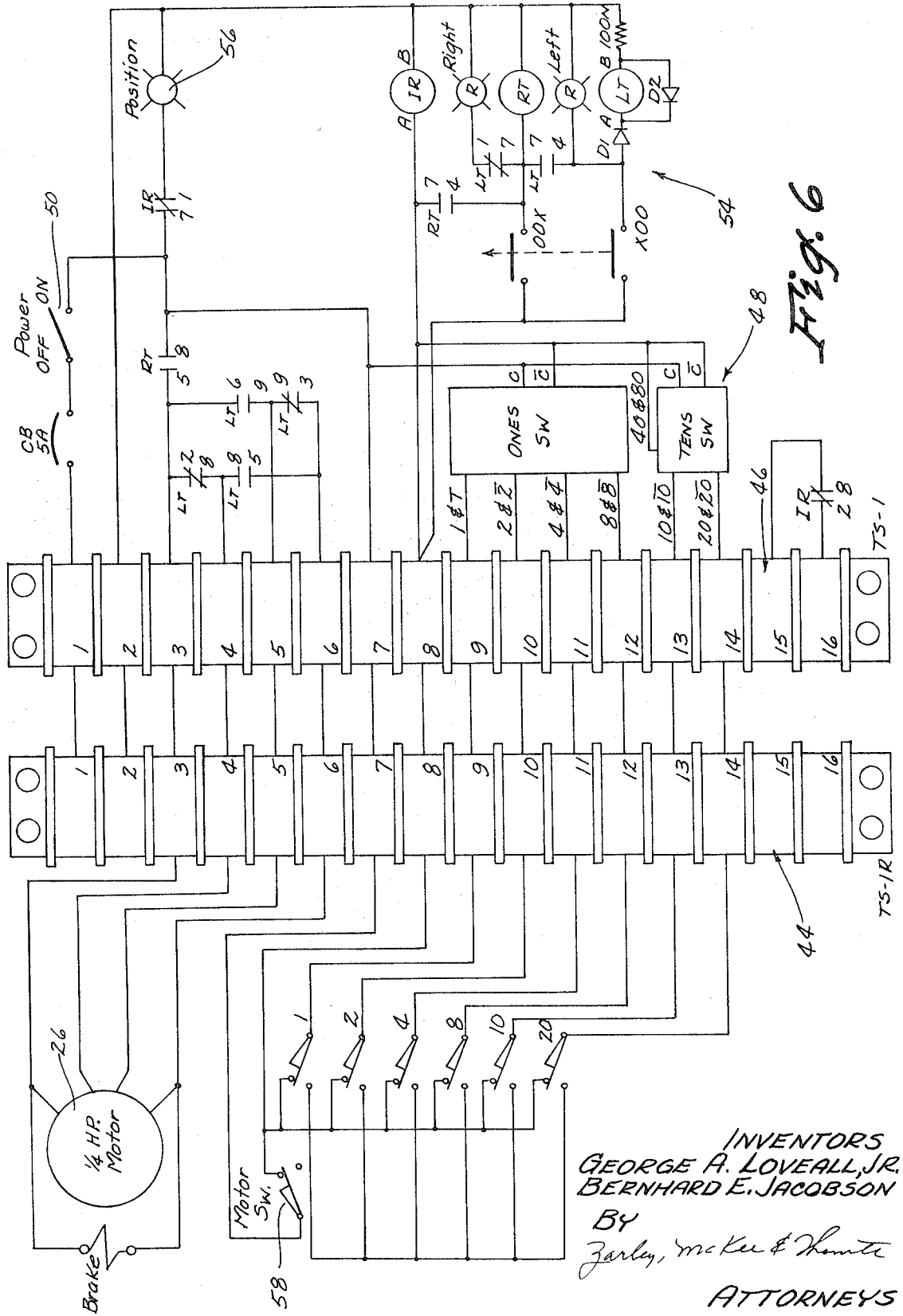
FIG. 6 is a schematic view of the electrical circuitry of the invention.

The numeral 10 refers to a conventional material distributing system comprising a distributor or consignor chute 12 rotatably mounted on a downspout support 14 having a plurality of downspouts 16 extending downwardly therefrom. The chute 12 is rotatably mounted on the support 14 and has its distributor shaft 18 extending downwardly therethrough. The chute or consignor 12 is in communication with the material to be handled such as grain, feed, etc. The downspouts 16 are connected to bins or loading areas. The consignor 12 is rotatable with respect to the downspouts 16 so that the material can be distributed to the proper bin or loading area.

The drive mechanism for the consignor is indicated by the reference numeral 20 and comprises a drive unit 22 secured to the underside of the support 14 and a control panel 24 which is located at some convenient area remote of the drive unit 22. The components of the drive unit 22 are mounted in a dust proof housing 23 having a removable cover at one side thereof. A gear-head motor 26 is mounted on the housing 23 and drives a conventional Geneva mechanism 28 through a chain and sprocket connection. The mechanism 28 is a six-position Geneva mechanism which is coupled to the output shaft 30 through a sprocket and chain arrangement. The Geneva mechanism 28 locks each time it returns to the "rest" position. A position encoding drum 32 is mounted on the output shaft 30 for rotation therewith. Drum 32 is provided with a predetermined number of actuator buttons 34 which are arranged in a predetermined number of spaced apart rows 36. Each row 36 corresponds to a position for the consignor chute 12.

A plurality of switches 38 are mounted on a switch support 40 secured to housing 23. Each of the switches 38 have a cam arm 42 extending therefrom which is adapted to engage the buttons 34 on the drum 32. Thus, engagement of a button 34 by the cam arm 42 will close that particular switch. By providing the proper number of buttons in the proper sequence, one or more of the switches will be closed at each particular position of the drum. The switches 38 "read" the buttons 34 in a binary fashion. The switches 38 are electrically connected to a terminal strip 44 mounted on the housing 23.

Terminal strip 44 is electrically connected to a terminal strip 46 mounted in the control panel 24. The binary information sensed by the switches 38 is decoded by a thumbwheel switch 48 electrically connected to the terminal strip 46. The thumbwheel switch 48 may either be a binary switch with complement with separate commons or a binary switch with a separate common for not-true bits.

A power switch 50 is electrically connected to the terminal strip 46 as seen in FIG. 6 with a 5 amp. circuit breaker 52 being provided for overload protection. The thumbwheel switch 48 has its digital information visible through the front of the control panel 24. A manually operable "run" switch 54 is mounted on the control panel 24 for running the motor 26 in either right or left directions. The output shaft 30 is connected to the lower end of the distributor shaft 18 so that rotation of the output shaft 30 causes rotation of the distributor shaft 18 and hence the consignor or distributor chute 12. A position light 56 is also provided on the control panel 24 as will be explained hereinafter.

The electrical circuitry of the invention is illustrated in schematic form in FIG. 6 and will not be described in detail since the legends thereon are self-explanatory. In operation, the operator simply sets the desired position he wants on the thumbwheel switch 48 and turns the run switch 54 either left or right. The actuation of the switch 54 causes the motor 26 to be operated until it reaches the proper position whereupon it shuts off and causes the position light to come on. The switches 38 sense or encode the position of the output shaft in binary form. The switches 38 are only read when the motor switch 58 is actuated which occurs when the output shaft 30 is in one of the positions and the Geneva position is in the locked position. As previously stated, the Geneva mechanism locks each time it turns to the rest position. The binary information sensed by the switches 38 is decoded by the thumb-wheel switch 48 in the control panel 24. A zero voltage output is obtained when the setting of the thumbwheel switch 48 and the output shaft 30 coincide. This causes the interlock relay (IR) to drop out which breaks the holding circuit for the motor relays (RT and LT). This, of course, stops the motor. At the same time the interlock relay causes the position light to light, indicating that the output shaft 30 has reached the proper position. The only time that the interlock relay is de-energized is when the output shaft is in the proper position, or the power is off, or the thumbwheel switch is set in the zero position. The zero position can be used as a light test for the position light.

In operation, the operator simply sets the position he wants on the thumbwheel switch 48 and turns the run switch 54 either left or right. This starts the motor which continues to run until it reaches the proper position whereupon it shuts off and causes the position light 56 to come on. Relay RT starts and stops the motor while relay LT controls its direction. Relay RT is de-energized when the output shaft is moving to the right and is energized when the output shaft is moving to the left. Overload protection is provided by the five amp. circuit breaker on the control panel.

Thus it can be seen that an extremely accurate means has been provided for rotatably moving a consignor chute with respect to a plurality of downspouts so that material will be directed to the proper bin or loading area. The electrical circuitry of the invention is greatly simplified over anything herebefore provided to permit convenient installation and maintenance. The consignor chute 12 is accurately positioned regardless of direction of travel with the chute 12 being locked in position until the system is actuated again. The binary coding described herein allows the use of far fewer wires between the control panel and the consignor than would ordinarily be required. It can be appreciated that only six sensing switches can handle up to thirty-nine positions.

The control system is designed to permit practically any type of interlocking. The control system has isolated contacts that can be used to prevent the elevator or screw conveyor feeding the consignor from running when the consignor is turning. Likewise, the circuit is designed so that the consignor can be interlocked and prevented from moving when the elevator or screw conveyor is operating. The control system disclosed herein permits it to be used with punch card or tape readers or even direct computer control. Remote digital readouts and/or recording printers can be added to the system if desired.

Thus it can be seen that the drive mechanism and control means therefor accomplishes at least all of its stated objectives.

We claim:

1. In combination with material distributing system comprising a plurality of downspouts and a movable distributor means which is in communication with a source of material and which is movable with respect to the downspouts to supply material thereto, said distributor means having a distributor shaft, comprising, a distributor positioning means connected to said distributor shaft for rotating said distributor sahft and said distributor means so that said distributor means communicates with a predetermined downspout, a control panel means remote from said positioning means, and a control means in said panel means for controlling the operation of the positioning means, said positioning means comprising a position encoding drum connected to said distributor shaft for rotation therewith, a sensing means in engagement with said encoding drum for sensing the relative rotational position of said drum, said sensing means being electrically connected to said control means, said encoding drum having a plurality of spaced apart actuator members arranged in spaced apart rows mounted on the periphery thereof, said sensing means engaging said actuator members, said sensing means comprising a plurality of switches adapted to engage the actuator members and to sense the position thereof in binary fashion, said control means comprising a bianry thumbwheel switch means in said control panel.

2. The combination of claim 1 wherein said switches are electrically connected to a first terminal strip in said positioning means, said control panel having a second terminal strip therein which is electrically connected to said first terminal strip.

3. In combination with material distributing system comprising a plurality of downspouts and a movable distributor means which is in communication with a source of material and which is movable with respect to the downsputs to supply material thereto, said distributor means having a distributor shaft, comprising, a distributor positioning means connected to said distributor shaft for rotating said distributor shaft and said distributor means so that said distributor means communicates with a predetermined downspout, a control panel means remote from said positioning means, and a control means in said panel means for controlling the operation of the positioning means, said positioning means comprising a position encoding drum connected to said distributor shaft for rotation therewith, a sensing means in engagement with said encoding drum for sensing the relative rotational position of said drum, said sensing means being electrically connected to said control means, said encoding drum having a plurality of spaced apart actuator members arranged in spaced apart rows mounted on the periphery thereof, said sensing means engaging said actuator members, said sensing means comprising a plurality of switches adapted to engage the actuator members and to sense the position thereof, said control means comprising a complementary switch means in said control panel, said positioning means comprises an electrical motor and a Geneva mechanism connected thereto, said Geneva mechanism being operatively connected to said encoding drum, said Geneva mechanism being rotatable at times to rotate said shaft and said encoding drum and being movable to a rest position between the times it is rotating said shaft and said encoding drum, said motor having a motor switch which is actuated only when said Geneva mechanism is in its rest position, said sensing means switches sensing the position of the encoding drum only when said motor is actuated.

4. The combination of claim 3 wherein said switches sense the position of said actuator members in a binary fashion, said control means comprising a binary switch means in said control panel.

5. The combination of claim 3 wherein said Geneva mechanism is in a locked condition when in its rest position.

* * * * *